July 5, 1966   R. M. ELLIOTT ET AL   3,259,239
SHEET FEEDING DEVICES
Filed Jan. 17, 1961   11 Sheets-Sheet 1
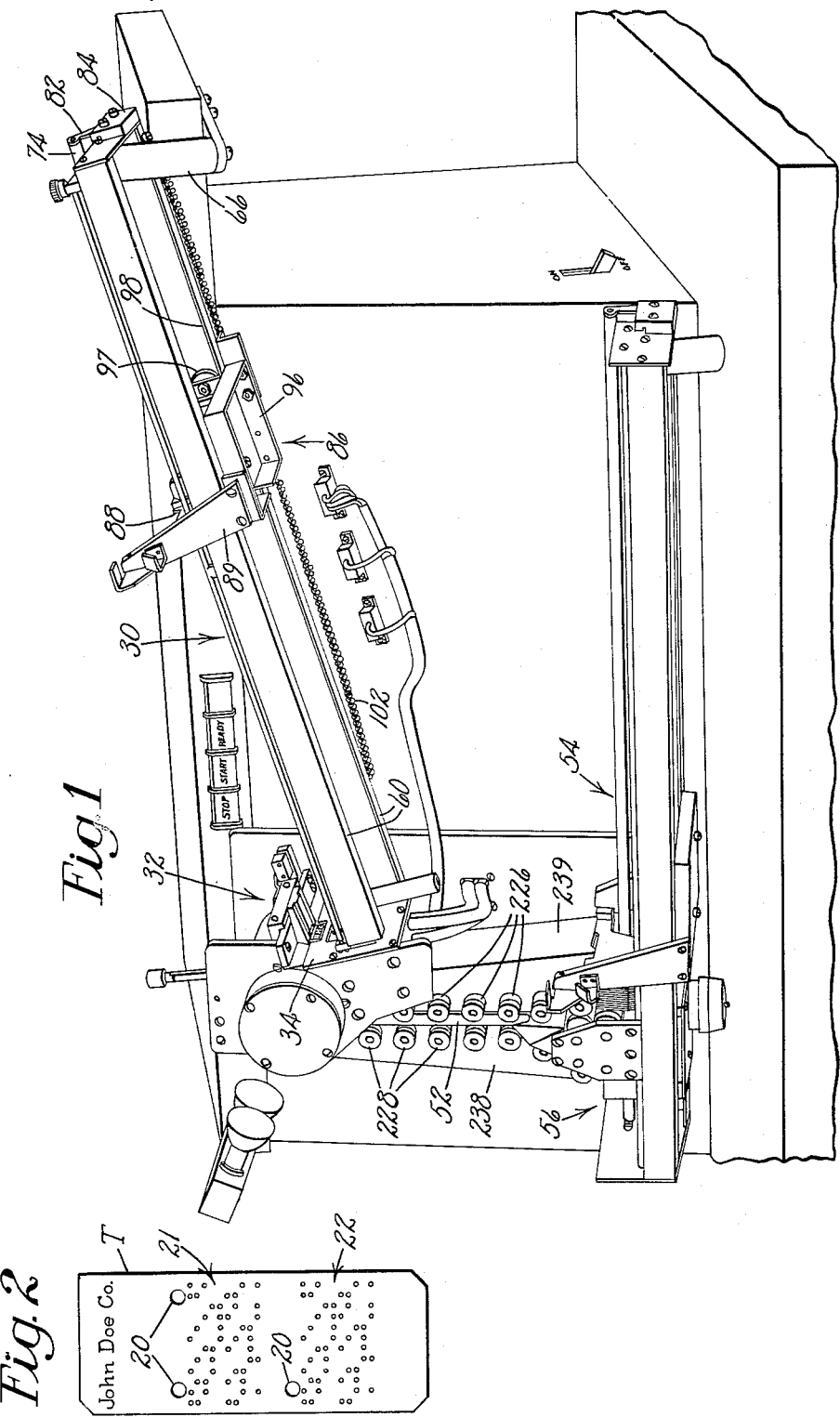

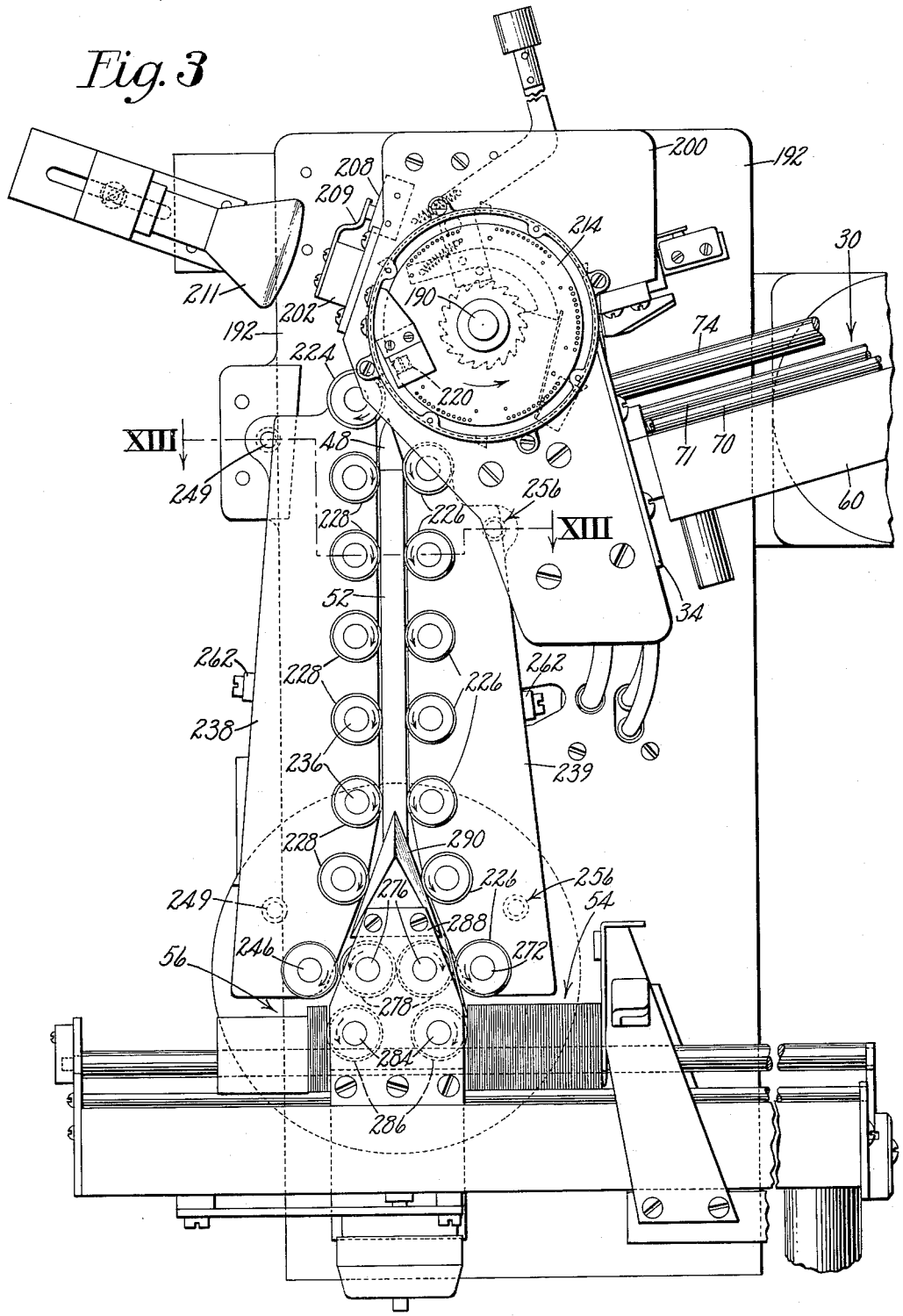

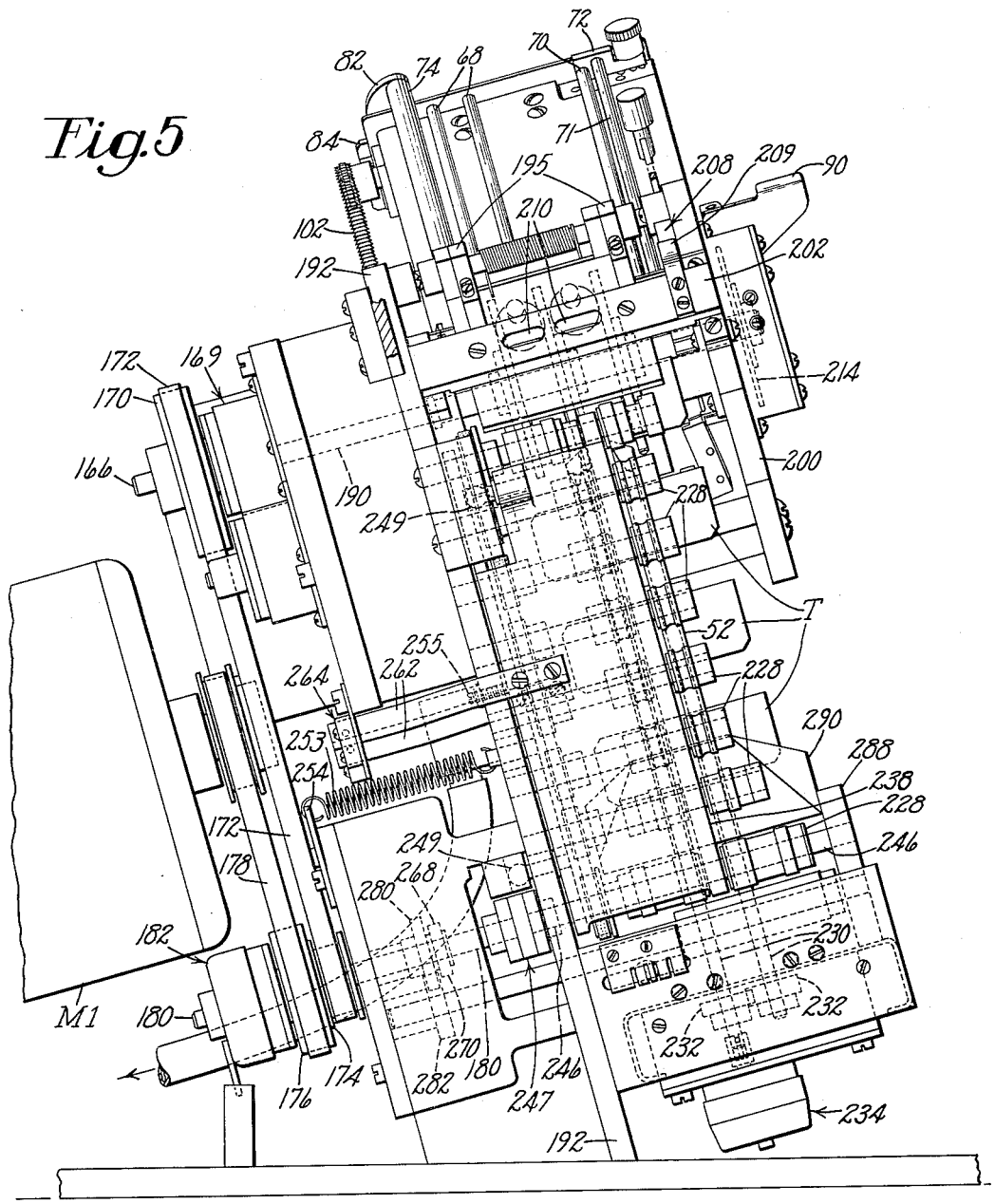

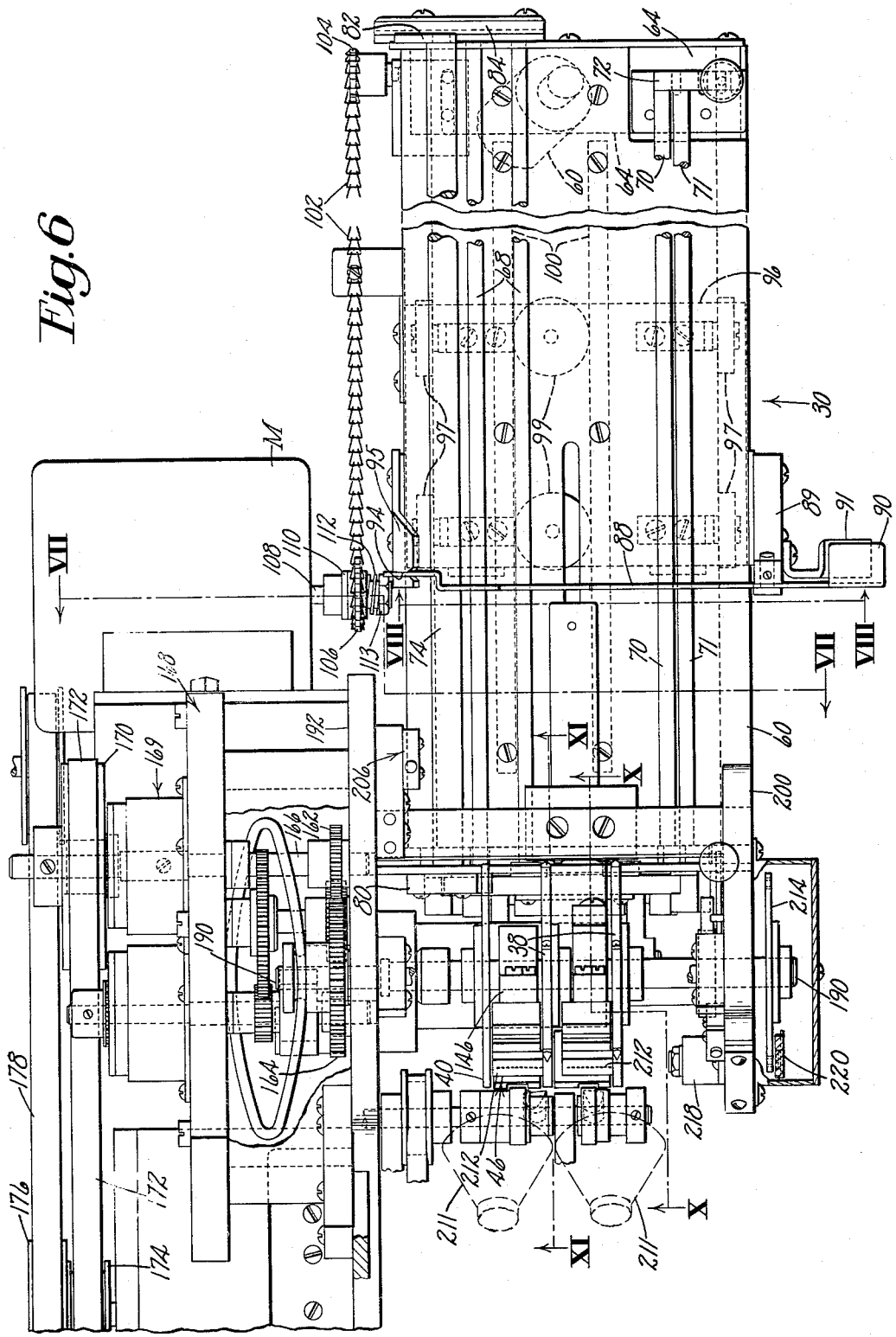

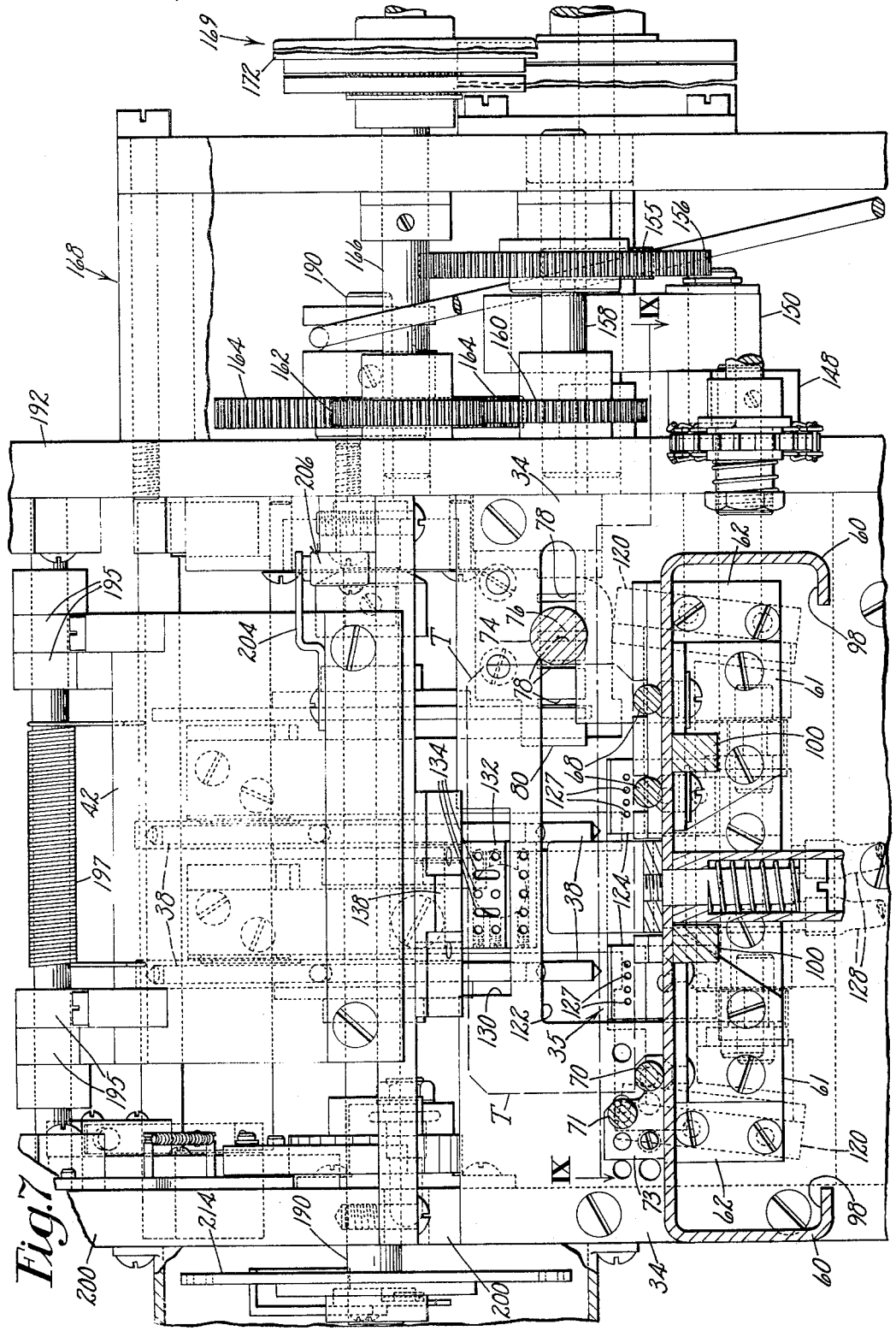

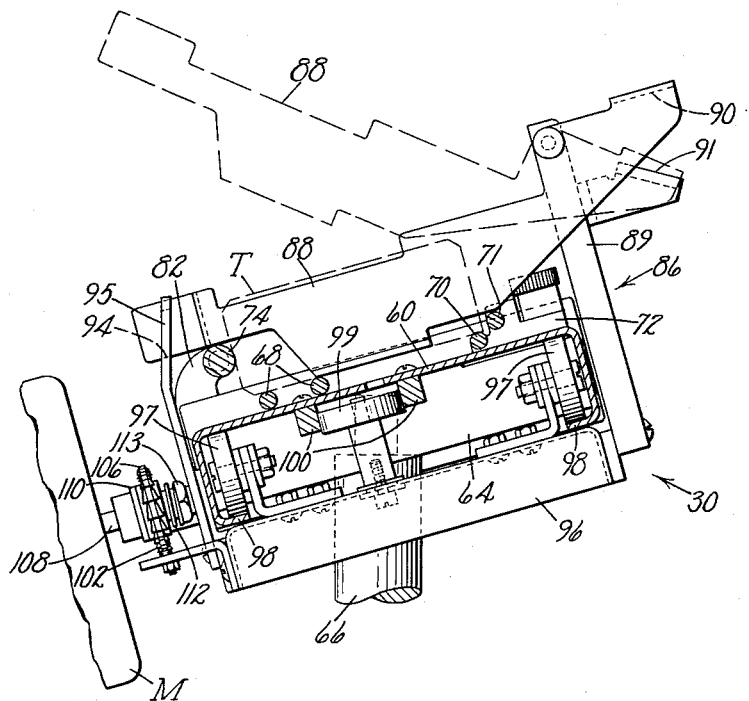

July 5, 1966  R. M. ELLIOTT ET AL  3,259,239
SHEET FEEDING DEVICES

Filed Jan. 17, 1961  11 Sheets-Sheet 8

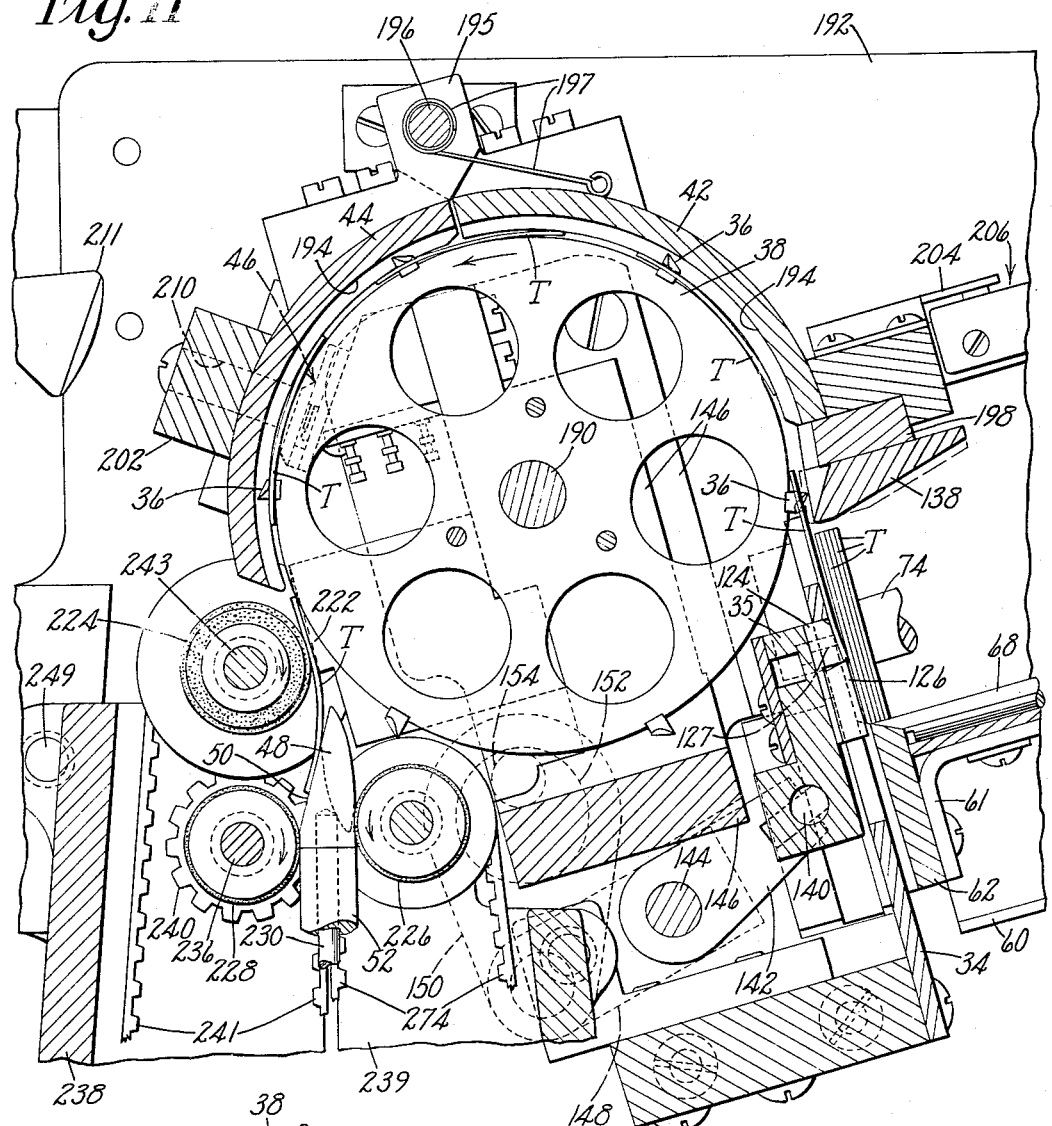
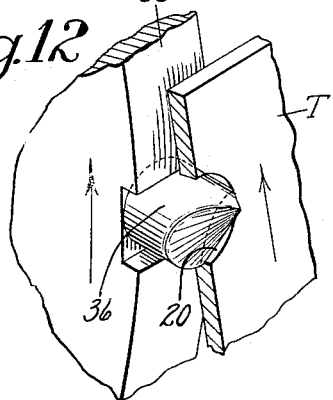

July 5, 1966    R. M. ELLIOTT ET AL    3,259,239
SHEET FEEDING DEVICES

Filed Jan. 17, 1961    11 Sheets-Sheet 10

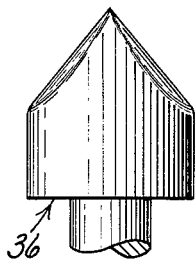
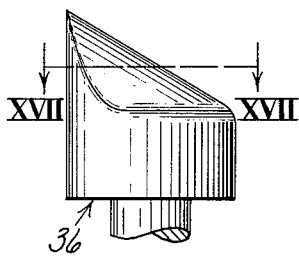
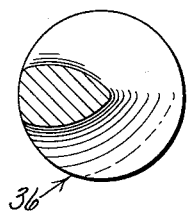
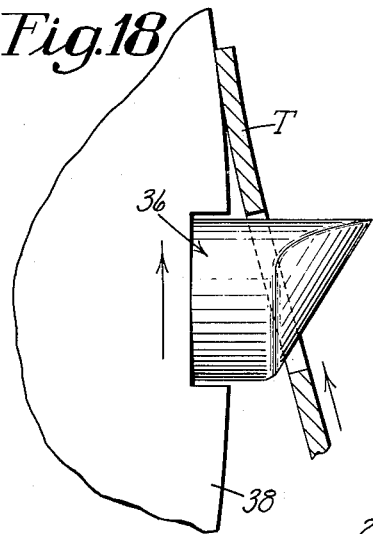
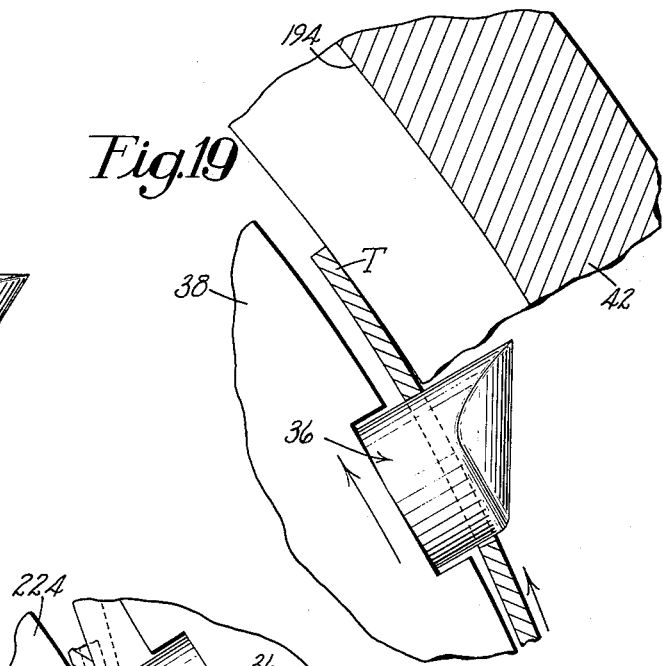
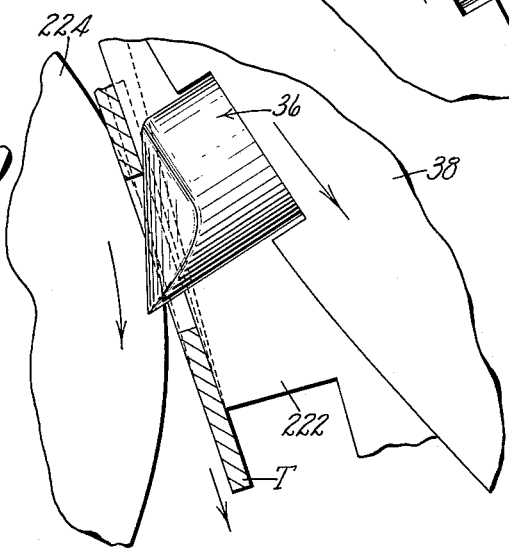

United States Patent Office 3,259,239
Patented July 5, 1966

3,259,239
SHEET FEEDING DEVICES
Richard M. Elliott, Beverly, Ralph E. Hobbs, Jr., Salem, William B. Mercaldi, Beverly, and Robert C. Simmonds, Jr., Topsfield, Mass., assignors to Kimball Systems, Inc., a corporation of New York
Filed Jan. 17, 1961, Ser. No. 83,341
40 Claims. (Cl. 209—73)

This invention relates generally to a device for feeding sheets. More particularly, the invention relates to a device for feeding records having locating holes accurately oriented with respect to data indications coded on the record.

The preferred embodiment of the invention is directed to the high speed feeding and sensing of records in the form of perforated merchandise tags. However, it should be understood that the processing of sheets in general or of other types of records are within the scope of the invention. The purposes to which the above perforated tags are ideally suited require that the tags retain the ability of being accurately processed even when roughly handled. To this end each tag is provided with two or more locating holes by which the tag may be fed by forces acting on internal surfaces not subjected to abuse and also accurately positioned with respect to a device for sensing coded data indications on the tag in positions accurately oriented with respect to the locating holes.

Accordingly, it is a general object of the invention to provide a separating and feeding mechanism for feeding large volumes of records one at a time from a stack past a reading device, the coded indications on the records being accurately registered therewith by means of the locating holes.

According to one feature of the invention, a magazine is provided for holding a large number of tags, the magazine including parallel rods which guide the tags by their edges, the rods being inclined sufficiently so that the force of gravity equals substantially the friction tending to retard the movement of the tags.

According to another feature of the invention, a tag separating the feeding device is arranged at the lower end of the magazine, the stack of records being urged against such device under a constant pressure without regard to the number of records in the stack.

According to a further feature of the invention, the separating device comprises a reciprocating slide having shoulders adapted to separate a single tag from the stack. To insure engagement of the edge of each record with the shoulders the slide is provided with an opening through which a suction is applied to the record. There is also provided another orifice through which suction is applied to another portion of the tag to insure that the leading edge of the record opposite the slide shoulder is aligned with a slot through which the tag is to be moved from the magazine.

According to another feature of this invention, the above separating mechanism is adapted to feed each record individually to a position where the locating holes in the record are registered with the path of movement of feed pins which transport the record and which register the coded area thereof with sensing means, the movement of the feed pins being synchronized with the reciprocation of the separating slide so that the feed pins enter the locating holes of the record smoothly without stopping its movement.

According to another feature each record is fed by the pins past a sensing device and is thereafter stripped from the pins. For this purpose a stripper plate in the path of movement of the record engages one surface thereof to remove the record from the pins. The opposite surface of the record is simultaneously engaged by a feed roll having a surface speed greater than that of the feed pins so that the record is moved forwardly from the pins as it is stripped therefrom. To assist this movement, the pins are inclined in the direction of feed so the forward relative movement combined with the inclination of the pins allows the record to be stripped without binding or damaging its locating holes.

According to a further feature, each record after stripping may be fed selectively along one of two possible paths depending on the significance of the data indications sensed. To this end novel path selecting means are arranged in the path of the stripped record and comprise oscillatable members having two opposed inclined surfaces either of which may be presented in said path to direct the record into one or the other of said paths.

The above and other features of the invention including novel combinations of parts and details of construction will now be described by reference to the accompanying drawings and pointed out in the claims.

In the drawings,

FIG. 1 is a perspective view of a machine embodying the present invention;

FIG. 2 is an illustration of a typical record to be processed;

FIG. 3 is a front elevation of a portion of the machine;

FIG. 5 is a left side elevation of the machine;

FIG. 6 is a plan view with parts broken away, this view being taken along a vertical line extending perpendicular to the leftwardly and rearwardly sloping tag magazine;

FIG. 7 is a section on line VII—VII of FIG. 6;

FIG. 8 is a section on line VIII—VIII of FIG. 6;

FIG. 9 is a section on line IX—IX of FIG. 7;

FIG. 11 is a section in enlarged scale on line XI—XI of FIG. 6;

FIG. 12 is an enlarged perspective view of a feed pin entering a locating hole of a tag;

FIG. 15 is a front elevation in enlarged scale of a feed pin;

FIG. 16 is a side view of the pin;

FIG. 17 is a section on line XVII—XVII of FIG. 16;

FIG. 18 is a side elevation partly in section showing the entrance of a feed pin in a locating hole of a tag;

FIG. 19 is a view similar to FIG. 18 but showing the locating hole fully registered on the base portion of a feed pin; and, FIG. 20 is a view greatly enlarged of the tag stripping mechanism.

Referring to FIG. 2, there may be seen a record in the form of a perforated merchandise tag T. The tag is provided with a plurality of locating holes 20 which are accurately oriented with respect to one or more fields 21 and 22 of coded data indications. While the illustrated tag is provided with code perforations, it should be understood that forms of recording other than perforations may be used on the tag without departing from the scope of the invention.

Figure 10:
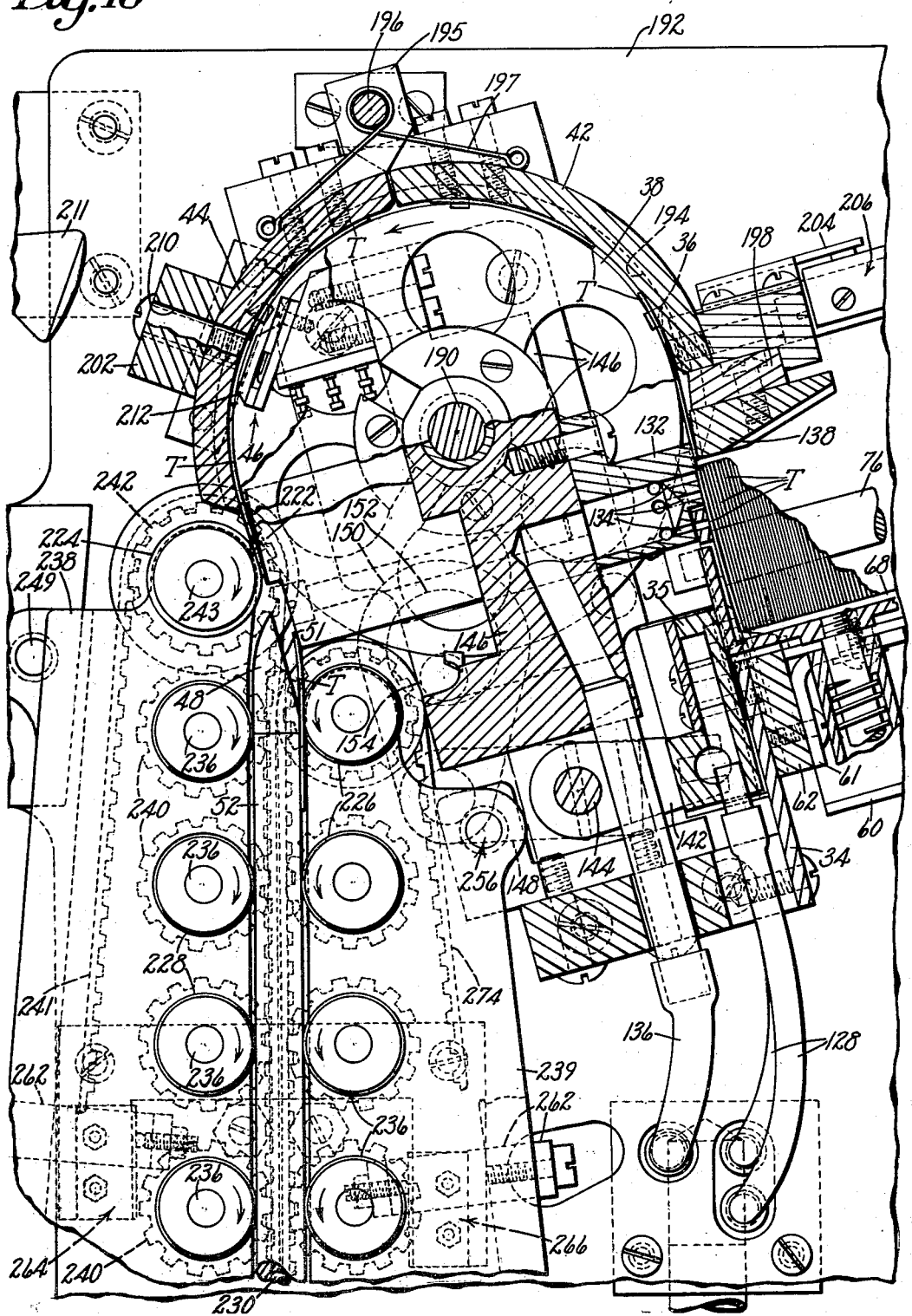
FIG. 10 is a section in enlarged scale on line X—X of FIG. 6.
Figure 14:
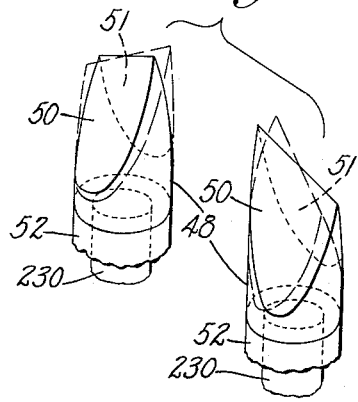
FIG. 14 is a perspective view of the tag path selecting elements.

Referring generally to FIG. 1, it may be seen that the machine is provided with a magazine 30 which declines toward a separating and feeding mechanism 32. Referring to FIG. 8, it may be seen that the hopper also declines rearwardly so that the tags tend to rest against one side of the magazine for orientation as they are fed downwardly. At the lower end of the magazine there is provided a plate 34 (FIG. 7) suitably slotted to expose a reciprocating separating slide 35 (see also FIGS. 10 and 11) adapted to separate the lowermost tag from the stack in the magazine and feed it upwardly through a slot into a position where the locating holes 20 may be engaged by feed pins 36 mounted in the peripheries of a pair of feed wheels 38. The rotation of the feed wheels and the reciprocation of the separating slide 35 are so timed that each tag is moved along a path where its locating holes 20 are oriented in the path of movement of the feed pins. As illustrated in FIGS. 10 and 11, each tag separated is fed by the pins along a circular path in a counterclockwise direction, the feed path being defined by the peripheries of the feed wheels and a support wheel 40 and by two arcuate plates 42 and 44. Each tag is fed thereafter past a read station 46 adapted to sense by photoelectric means the code perforations in the tag. According to the significance of certain of the coded data sensed, the tag is thereafter fed selectively along one of two paths after being stripped from the feed pins. For directing the tag in either one of said paths, the device is provided with a pair of oscillatable members 48 each of which have two opposed inclined surfaces 50 and 51 (FIG. 14) passing through the axis of oscillation of the members. By oscillating the members to either position shown in FIGS. 10 or 11, it may be seen that the surfaces 51 are presented in the path of movement of the tag as seen in FIG. 10 or the surfaces 50 as seen in FIG. 11 to direct the tags encountered along one side or the other of a pair of rods 52. At opposite sides of the rods, there are provided a plurality of feed rolls which convey the tag downwardly into one of two receivers 54 and 56 (FIGS. 1 and 3).

*Feed magazine*

The feed magazine 30 includes a channel member 60 secured at its lower end by brackets 61 (FIGS. 7 and 11) to a block 62 fixed on the plate 34 which is carried by the frame of the tag separating and feeding mechanism. At its upper end the channel member 60 is provided with a block 64 (FIG. 8) supported on a post 66 carried by a bracket extending from a table secured to the upper part of the machine (see FIG. 1). The tag guiding portions of the magazine include two parallel rods 68 (FIGS. 6, 7 and 8) fixed on the channel member and rods 70, 71 secured at their upper ends in a block 72 adjustably mounted on the block 64 and at their lower ends fixed in a block 73 (FIG. 9) adjustably secured to the plate 34. Referring to FIGS. 7 and 8, it may be seen that the bottom edges of the tags are supported by rods 68 and 70 while the rod 71 is disposed to prevent excessive outward movement of the tags but does not necessarily engage the tags when the hopper is properly adjusted. The left-hand edges of the tags, as seen in FIG. 8, are engaged by a rod 74 which may be adjusted to accommodate different lengths of tags. To this end, the rod 74 at its lower end is provided with a tongue 76 (FIG. 7) which may be inserted in any one of four slots 78 in a fixed plate 80. The upper end of the rod 74 is carried by a bracket 82 which by a suitable tongue and groove connection is adjustably secured by a block 84 to the upper end of the magazine. Referring to FIGS. 1 and 8, it may be seen that the magazine slopes downwardly and also rearwardly so that the tendency of the stack of tags is to rest against the adjustable rod 74. The inclined disposition of the magazine is such that the force of gravity tending to cause the tags to slide downwardly along the rods substantially equals the force of friction resisting such movements so that no appreciable changes in the force exerted against the lowermost tag in the stack are caused by a variation in the number of tags in the magazine. To insure that the stack of tags is moved downwardly along the rods under a substantially constant pressure, there is provided a carriage 86 having a pressure plate 88 adapted to bear against the upper end of the stack of tags. The plate 88 (FIG. 8) at one end is pivotally mounted on an upstanding arm 89 of the carriage and is provided with a tab 90 overlying a fixed tab 91 also projecting from the upstanding arm 89. By squeezing the tabs 90 and 91 together, an operator manually swings the plate 88 out of engagement with the stack of tags to facilitate the addition of tags to the stack. At the opposite end the plate 88 is received in a slot 94 in an upstanding tab 95 at the rear side of the carriage (see also FIG. 6). The carriage comprises a box-like frame 96 to which the arm 89 and the tab 95 are secured, and which at opposite sides has secured thereto rolls 97 adapted to ride inside ledges 98 of the channel member 60. The carriage frame is further provided with a pair of rolls 99 adapted to ride between guide rails 100 secured to the underside of the channel member 60. Thus, it may be seen that the carriage is adapted to roll freely downwardly along the channel member to press the plate 88 against the upper end of the tag stack. For applying a constant downward force against the tag stack, the carriage has fixed thereto an endless chain 102 which at its upper end is carried on an idler sprocket 104 rotatably secured to the upper end of the channel member 60 and which at its lower end is carried by a sprocket 106 freely mounted for rotation on a shaft 108 of a motor M. The shaft is provided with a friction plate 110 against which the sprocket 106 is pressed by an adjustable spring 112. The spring pressure is suitably adjusted by turning a nut 113 to cause a certain rotatable force to be exerted on the sprocket 106 before slippage occurs between the plate and the sprocket. During operation of the machine, the motor M is constantly rotated and through the friction plate 110 drives the chain 102 with a constant force so that the plate 88 of the carriage urges the stack downward under a constant pressure regardless of the number of tags in the stack.

*Tag separating mechanism*

Figure 4:
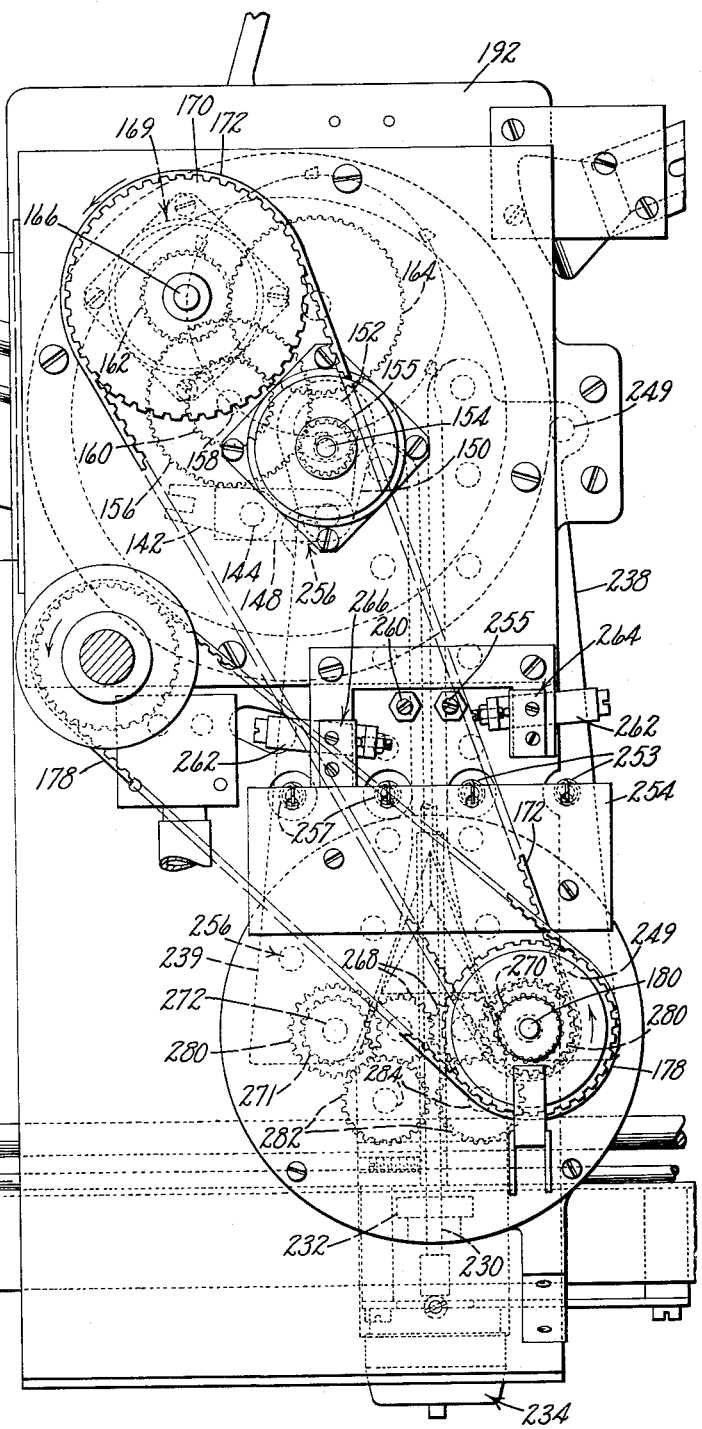
FIG. 4 is a rear elevation of the same portion of the machine.

The tag separating mechanism includes the slide 35 adapted to reciprocate heightwise at the lower end of the tag stack in the magazine. The slide is guided for movement at an angle adapted to feed each tag heightwise as well as toward the rod 74 of the magazine, as best seen in FIG. 7, the slide being guided for such movement by blocks 120 (see also FIG. 9) fixed to the plate 34. As seen in FIG. 7, the plate 34 is provided with a clearance slot 122 which receives two separating knife holders 124 fixed to the slide 35. The holders are each provided with a knife block 126 (FIG. 11) adapted to engage the lower edge of the end tag of the stack resting against the holders 124 so that as the slide 35 is reciprocated heightwise the knife blocks engage the lower edge of the end tag in the stack to separate the tag from the stack and move it heightwise from the magazine. To insure firm engagement of the tag with the knife holders 124, and hence, also alignment of its edge with the knife blocks 126, each holder is provided with openings 127 (FIGS. 7 and 11) leading from a cavity in the slide 35 which is suitably connected by flexible tubes 128 (FIG. 10) and suitable conduits to a vacuum pump, not shown. The pump may be of any suitable type capable of applying a substantially constant suction. Thus, there is applied to the end tag in the stack a constant suction through the openings 127 to hold the tag firmly in engagement with the holders 124. The plate 34 is also provided with another slot 130 which exposes a throat block 132 having openings 134 (FIGS. 7 and 10) communicating through a tube 136 to the vacuum pump. Thus the portion of the end tag adjacent its upper edge is urged by suction against the throat block 132 and into alignment with a slot formed between the throat block and one edge of a throat plate 138. This slot is of a width sufficient to accommodate the thickness of only one tag as it is moved heightwise by the slide 35. The slide 35 (FIG. 9) is slotted adjacent its opposite sides and has trunnion pins 140 extending through the slots, the pins being received in the slotted ends of a pair of arms 142 fixed to a shaft 144. The shaft is mounted in suitable bearings in the frame and in portions of a block 146. One end of the shaft 144 extends to the right, as seen in FIG. 9, through the frame and has fixed thereto an arm 148 (see also FIG. 11). This arm is connected by a link 150 to an eccentric 152 integral with a shaft 154. The shaft also has fixed thereon a pinion 155 (FIG. 4) driven by an intermediate gear 156 fixed to a stub shaft 158 which also has a pinion 160 connected to a driven gear 162 through an intermediate gear 164. The gear 162 is on a driven shaft 166 which extends through a casing 168 and is connected through a magnetic clutch 169 to a toothed pulley 170 connected by a belt 172 to another toothed pulley 174 integral with another pulley 176 connected to a motor M (FIG. 5) by a belt 178. The pulleys 174, 176 rotate freely on a shaft 180 but are adapted to drive the shaft through another magnetic clutch 182 for a purpose which will subsequently appear. During normal operation of the machine the clutch 169 remains engaged driving the shaft 166, causing the slide 35 to be reciprocated heightwise. Thus, tags are separated continuously one at a time from the stack in the magazine and moved heightwise through the throat slot and into a predetermined relationship to the feed wheels 38.

Feeding mechanism

The feed wheels 38 are each provided with six feed pins 36 equally spaced around its periphery. Referring to FIGS. 15 through 20, it may be seen that the base portion of each pin is cylindrical in shape and of a size corresponding to the individual locating holes of each record tag. Above the base portion and at opposite sides each pin is tapered and of a shape (see FIG. 17) adapted to engage a substantial portion of a locating hole for guiding the hole into register with the base portion under conditions of sidewise misalignment. The purpose of such a pin shape is to avoid damage to the locating hole which could occur if the pins were merely conical in shape providing only a small area of engagement with either side of a hole. The rearward side of each pin above its base portion is also inclined in the direction of feed for a purpose which will subsequently appear. The feed wheels are secured to a shaft 190 (FIGS. 6, 7, 10 and 11) in such relation that the pins 36, in the two wheels are aligned in cooperating pairs. The shaft 190 is journaled for rotation in suitable bearings in the frame 146 which has upright portions rising between the feed wheels and the support wheel 40 also fixed to the shaft. At its right end, as seen in FIG. 7, the shaft projects beyond the block 146, through a frame plate 192 and into the casing 168 where the shaft has fixed thereto the intermediate gear 164.

As above described, the eccentric 152 for reciprocating the separating slide 35 is also driven from the gear 164. The gearing ratios are so designed that the feed wheels 38 are rotated the distance between the feed pins 36 during one complete reciprocation of the feed slide 35. The tag is moved upwardly by the feed slide 35 along a path converging with the path of the feed pins. The movement of the pins and the slide are so synchronized that the tag and pins are moving at substantially the same speed with the pins, as best seen in FIGS. 18 and 19. In this manner the pins enter the holes without imparting any feeding force thereto until the base portions of the pins are fully engaged with the holes. Thus, the only forces initially imparted to the tag through the locating holes are light forces applied over substantial areas of the shaped sides of the pins to align the holes with the base portions of the pins. After the base portions of the pins enter the locating holes the tag is fed along a path defined by the peripheries of the wheels 38 and 40 and by the arcuate plates 42 and 44. The plates are provided with clearance grooves 194 into which the feed pins project so that the tag is held on the base portions of the pins. The plates are also provided with suitable lugs 195 (FIGS. 7 and 10) pivotally mounted on a rod 196 carried at opposite ends on the side frames. The plates 42 and 44 are held down in the positions illustrated in FIGS. 10 and 11 by a torsion spring 197 which urges the plate 42 clockwise, as seen in FIG. 10, about the rod to a position determined by a bar 198 which supports the throat plate 138 and which is secured at opposite ends to the frame plate 192 and 200. The plate 44 is also urged about the rod in a counterclockwise direction to a position determined by the engagement of a bar 202 on the plate 44 with portions of the frame 192 and 200. When the plate 42 is in the position shown in FIGS. 10 and 11, an arm 204 secured to the plate is adapated to engage and actuate a limit switch 206 carried by the frame 192. Thus if for any reason the plate 42 should be swung counterclockwise away from the disks during the operation of the machine, actuation of the switch 206 will indicate such fact. In much the same manner clockwise movement of the plate 44 will cause actuation of a switch 208 (FIG. 5) mounted on the frame 200 and actuated by an arm 209 extending from the bar 202. Thus, a malfunction in which either of the plates 42, 44 are swung outwardly such as would be caused by a tag jam actuates the respective switch 206 or 208 to indicate such malfunction and to cause appropriate action on the part of the machine. The plate 44 and bar 202 are further provided with openings 210 (FIG. 5) through which light is projected by two lamps 211 onto one face of each tag T as it is fed for a purpose which will presently appear.

Sensing mechanism

For sensing the code perforations in the tag, the read station 46 (FIGS. 6, 10 and 11) includes a plurality of closely spaced light responsive cells mounted in blocks 212 carried by the frame 146 adjacent the feed wheels 38. Thus, as the tags are fed by the feed pins past the cells, light projected by the lamps 211 passes through the code perforations in the fields 21, 22 of the tags to energize the cells. For timing the sensing of the code perforations which are arranged in columns on each tag the feed wheel shaft 190 is provided at its left end, as seen in FIGS. 3 and 7, with a timing disk 214 suitably perforated in positions related to the positions of the feed pins on the feed wheels to allow passage of light projected from a lamp mounted in a casing 218 (FIG. 6) supported by the frame member 200. At the opposite side of the timing disk there is mounted a light responsive cell 220 adapted to be energized by projection of light through any one of the timing holes in the disk. Thus, upon arrival of the code perforations in the tag T at the sensing cells in the blocks 212, a timing hole in the disk 214 allows light to be projected from the lamp onto the timing cell 220 to provide timing pulses in any well known manner to actuate suitable control circuitry. The electrical circuitry for decoding and otherwise processing the coded data sensed from the tag is not shown since it forms no part of the present invention. However, any suitable circuitry or data processing mechanisms may be utilized without departing from the scope of the invention.

Sorting mechanism

Referring particularly to FIGS. 10, 11 and 20, it may be seen that after passing beyond the sensing unit, each tag is engaged by stripper blocks or plates 222 arranged between the feed wheels 38 and the wheel 40 so that by engagement with one face the tag is stripped from the feed pins during continued rotation of the feed wheels. While the tag is being stripped from the feed pins, a feed wheel 224 opposite the stripper block engages the opposite face of the tag. The surface speed of the wheel 224 is greater than the speed of the feed pins so that as the locating holes clear the base portions of the pins the tags are moved forwardly along the inclined surfaces of the pins.

According to one use for the machine the tags being sensed may contain data of different significance such as might be used in master or detail tags according to well known principles. A master tag would be indicated by a predetermined code perforation in a selected column of the tag and it is usually desired that such master tags be separated from the detail tags. To this end there are provided the previously described pair of deflecting members 48, best seen in FIGS. 10, 11 and 14. The members are circular in cross section at their lower ends and are each provided at their upper ends with inclined surfaces 50 and 51 passing at opposed angles through the axes of oscillation of the members. As seen in FIG. 10, the inclined surfaces 51 on the members are arranged to deflect the tags stripped from the feed pins along a path to the right of the sleeves 52 co-axial with and underlying the members.

For conveying the tags along this path, to the right of the sleeves, there are a plurality of feed wheels 226 adapted to move the tags downwardly along the sleeves. By rotating the members 48 from the position shown in FIG. 10 to that shown in FIG. 11, the inclined surfaces 50 act to direct the tags along a path to the left of the sleeves 52 and into engagement with feed wheels 228 provided to cause movement of the tags along such path. For rotating the deflecting members, each member 48 is fixed to a rod 230 which extends downwardly through its associated sleeve 52, the rods being provided at their lower ends, as seen in FIG. 5, with meshing pinions 232 which cause the rods to rotate in opposite directions. The rearward or left-hand rod 230, as seen in FIG. 5, is also connected to a rotary solenoid 234 which upon energization causes the rods 230 and hence also the deflecting members 48 to be rotated approximately twenty-five degrees to present one or the other of the surfaces 50 and 51 in the path of the tag. Thus, it is possible through well-known decoding and control circuitry, not shown, to energize the solenoid 234 according to the significance of data sensed from the tag to deflect the tag in one of two possible selective paths.

*Conveyor mechanism*

For conveying the tags along either of the paths selected by the actuation of the deflector members 48 the feed wheels 226 and 228 are arranged to engage the tags at the right or left sides, respectively, of the sleeves 52. The feed wheels 228 are fixed to shafts 236 journaled in a frame 238, while the feed wheels 226 are similarly mounted in a frame 239. At their rearward ends the shafts 236 are provided with sprockets 240 which carry a toothed belt 241. At its upper end the belt is carried on a sprocket 242 (FIG. 10) fixed to a shaft 243 to which is also fixed the feed wheel 224 opposite the stripper plate. The lowermost sprocket 240 and its associated feed wheel 228 are fixed to a shaft 246 (FIGS. 3 and 5) which at its rearward end, is connected through a flexible coupling 247 to the drive shaft 180. Thus during operation of the machine, the shaft 180 is continually rotated driving the feed wheels 228.

Figure 13:
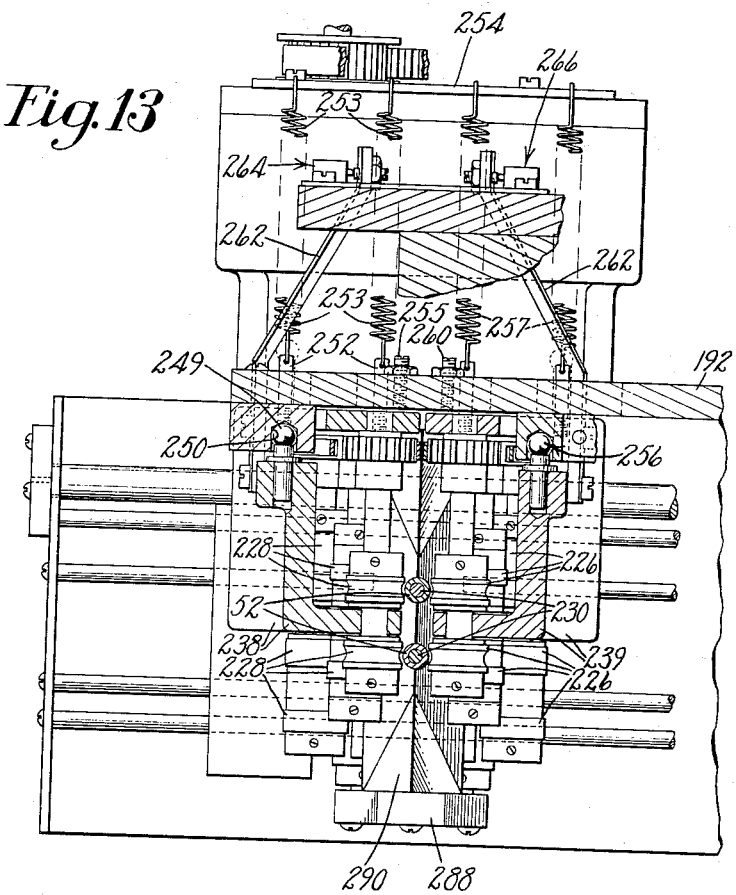
FIG. 13 is a section on line XIII—XIII of FIG. 3.

The frame 238 is mounted for limited rocking movement on a pair of balls 249 (FIGS. 3 and 13) mounted in sockets 250 fixed to portions of the frame 192. At its rearward side the frame 238 is provided with two pins 252 (FIG. 13) which extend through suitable openings in the frame 192, the pins being connected by springs 253 to a plate 254 at the rearward side of the machine. The springs under tension urge the frame 238 rearwardly holding the balls 249 in their respective sockets 250 and tending to rock the frame about the sockets to a position determined by a stop screw 225 threaded in the frame 192. The frame 239 is similarly mounted on ball and socket joints 256 there being provided springs 257 which rock the frame 239 to a position determined by another stop screw 260. By this sort of mounting each of the frames 238 and 239 may independently rock about their ball and socket joints to cause the feed rolls to engage the tags resiliently and to allow removal of the tags at either side of the sleeves 52 in the event of tag jams or other malfunction. In the event of a tag jam it would be usual for more than one tag to be passing through the rolls thus rocking the associated frame about its ball joints. To detect such rocking movements each of the frames 238, 239 is provided with an arm 262 which extends rearwardly and inwardly in a position to actuate associated switches 264, 266 so that if either frame is rocked outwardly its associated limit switch will be actuated to indicate malfunction and appropriately condition the operation of the machine.

For operating the feed rolls 226 in the frame 239 there are provided a pair of intermediate gears 268 (FIGS. 4 and 5) engaged with a gear 270 on the shaft 180 and with a gear 271 on a shaft 272 to which is fixed the lower feed roll 226 in the frame 239. This shaft is also provided with a sprocket which drives a belt 274 (FIG. 11) running over sprockets on the feed wheels 226. The intermediate gears 268 are carried on shafts 276 which extend forwardly and have fixed thereto feed rolls 278 (FIG. 3) which cooperate with the lower feed rolls 226 and 228, for depositing the tags into the receivers 54, 56 at the end of each feed path. The shafts 180 and 272 are also provided with pinions 280 which through gears 282 drive shafts 284 having fixed thereto another set of feed rolls 286 which act to move the tag into its lowermost position in the selected receiver 56 or 54. The shafts 276 and 284 are journaled in the frame 192 and in another side frame 288 associated with the receivers. Also fixed between the frames 192 and 288 is a wedge-shaped member 290 through which pass the sleeves 52. The wedge-shaped member acts to direct the tags from engagement with the sleeves 52 and between the lowest feed rolls and into the selected receiver 54 or 56.

Having thus described our invention, what we claim as new and desire to secure by Letters Patent of the United States is:

1. In a device for separating sheets from a stack, a magazine for supporting a stack of sheets for bodily movement toward one end of the magazine, a slide at said end, a shoulder on said slide engageable with one edge of the end sheet in the stack, said slide having an opening through which a suction is applied to said sheet for aligning the sheet edge with said shoulder, and means for reciprocating said slide to move said sheet edgewise from the magazine.

2. In a device for separating sheets from a stack, a magazine for supporting a stack of sheets for bodily movement toward one end of the magazine, a slide at said end, a shoulder on said slide engageable with one edge of the end sheet in said stack, means engageable with said end sheet adjacent the opposite edge thereof, said engageable means defining one side of a slot providing passage from the magazine for said end sheet, said engageable means having an opening through which a suction is applied to the sheet to align said opposite edge with said slot, and means for reciprocating said slide for moving the end sheet from the magazine through said slot.

3. In a device for separating sheets from a stack, a magazine for supporting a stack of sheets for bodily movement toward one end of the magazine, a slide at said one end, a shoulder on said slide engageable with one edge of the end sheet in the stack, said slide having an opening through which a suction is applied to said sheet to align the sheet edge with said shoulder, means engageable with said sheet adjacent the opposite edge thereof, said engageable means defining one side of a slot providing passage from the magazine for said end sheet, said engageable means also having an opening through which a suction is applied to the sheet to align said opposite edge with said slot, and means for reciprocating said slide for moving said end sheet from the magazine through said slot.

4. In apparatus for presenting sheets to a separating device, a magazine for supporting a stack of sheets by their edges for movement toward said device, said magazine including surface means supporting one edge of said sheets, said surface means being disposed in a plane inclined sufficiently to cause the force of gravity acting to move said stack downwardly along said surface means to equal substantially the friction between the surface means and the sheets acting to prevent such movement, a plate engaging the upper end of said stack, a carriage on which the plate is mounted, means for guiding the carriage in directions substantially parallel to the supporting surface means, an endless belt having one run connected to said carriage, pulleys mounting said belt, and motor means supplying a predetermined constant torque to one of said pulleys for causing the plate to be pressed against said stack, said plate forcing the lowermost sheet in the stack toward the separating device substantially at said predetermined force regardless of the number of sheets in said stack.

5. In apparatus for presenting sheets to a separating device, a magazine for supporting a stack of sheets by their edges for movement toward said device, said magazine including surface means supporting one edge of said sheets, said surface means being disposed in a plane inclined in one direction sufficiently to cause the force of gravity acting to move said stack downwardly along said surface means to equal substantially the friction between the surface means and the sheets acting to prevent such movement, a guide surface engageable with another edge of said sheets, said plane also declining in another direction toward said guide surface for causing the force of gravity to move the sheets against said guide surface whereby said sheets are registered by two edges as they are moved toward said device, a plate engaging the upper end of said stack, a carriage in which the plate is mounted, means for guiding the carriage in directions substantially parallel to the supporting surface means, an endless belt having one run connected to said carriage, pulleys mounting said belt, and motor means supplying a predetermined constant torque to one of said pulleys for causing the plate to be pressed against the upper end of said stack with a predetermined force, said plate forcing the lowermost sheet in the stack toward the separating device substantially at said predetermined force regardless of the number of sheets in said stack.

6. In apparatus for separating sheets from a stack, a separating device, a magazine for supporting a stack of sheets by their edges for movement toward said device and including surface means supporting one edge of said sheets, said surface means being disposed in a plane declining in one direction toward said device to cause the force of gravity acting to move said stack downwardly along the surface means to equal substantially the force of friction acting to prevent such movement, a guide surface engageable with another edge of said sheets, said plane also declining in another direction toward said guide surface for causing the sheets to rest against said guide surface whereby said sheets are aligned with said device by two edges as they are moved in said magazine, said separating device including a slide, a shoulder on said slide engageable with one edge of the end sheet in the stack, said slide having an opening through which a suction is applied to said sheet for aligning the sheet edge with said shoulder, and means for reciprocating said slide to move said sheet edgewise of the magazine.

7. In apparatus for separating sheets from a stack, a separating device, a magazine for supporting a stack of sheets by their edges for movement toward said device and including surface means supporting one edge of said sheets, said surface means being disposed in a plane declining in one direction toward said device to cause the force of gravity acting to move said stack downwardly along the surface means to equal substantially the force of friction acting to prevent such movement, a guide surface engageable with another edge of said sheets, said plane also declining in another direction toward said guide surface for causing the sheets to rest against said guide surface whereby said sheets are aligned with said device by two edges as they are moved in said magazine, said separating device including a slide, a shoulder on said slide engageable with said one edge, means engageable with said end sheet adjacent the opposite edge thereof, said engageable means defining one side of the slot for providing passage from the magazine for said end sheet, said engageable means having an opening through which a suction is applied to the sheet to align said opposite edge with said slot, and means for reciprocating the slide for moving the end sheet from the magazine through said slot.

8. In apparatus for separating sheets from a stack, a separating device, a magazine for supporting a stack of sheets by their edges for movement toward said device and including surface means supporting one edge of said sheets, said surface means being disposed in a plane declining in one direction toward said device to cause the force of gravity acting to move said stack downwardly along the surface means to equal substantially the force of friction acting to prevent such movement, a guide surface engageable with another edge of said sheets, said plane also declining in another direction toward said guide surface for causing the sheets to rest against said guide surface whereby said sheets are aligned with said device by two edges as they are moved in said magazine, said separating device including a slide, a shoulder on said slide engageable with one edge of the end sheet in the stack, said slide having an opening through which a suction is applied to said sheet to align the sheet edge with said shoulder, means engageable with said sheet adjacent the opposite edge thereof, said engageable means defining one side of a slot providing passage from the magazine for said end sheet, said engageable means also having an opening through which a suction is applied to the sheet to align said opposite edge with said slot, and means for reciprocating said slide for moving said end sheet from the magazine through said slot.

9. In a device for separating sheets from a stack, a separating device, a magazine for supporting a stack of sheets by their edges for movement toward said device, said magazine including a plurality of rods supporting said sheets by one edge, said rods being disposed in a plane declining in one direction toward said device to cause the force of gravity acting to move said stack downwardly along the rods to equal substantially the force of friction acting to prevent such movement, a guide rod engageable with another edge of said sheets, said plane also declining in another direction toward said guide rod for causing the force of gravity to move the sheets against said guide rod to align two edges of the sheets with said device as they are moved in said magazine, said separating device including a slide, a shoulder on said slide engageable with one edge of the end sheet, said slide having an opening through which a suction is applied to said sheet for aligning the sheet edge with said shoulder, and means for reciprocating said slide to move said sheet edgewise of the magazine.

10. In a device for separating sheets from a stack, a separating device, a magazine for supporting a stack of sheets by their edges for movement toward said device, said magazine including a plurality of rods supporting said sheets by one edge, said rods being disposed in a plane declining in one direction toward said device to cause the force of gravity acting to move said stack downwardly along the rods to equal substantially the force of friction acting to prevent such movement, a guide rod engageable with another edge of said sheets, said plane also declining in another direction toward said guide rod for causing the force of gravity to move the sheets against said guide rod to align two edges of the sheets with said device as they are moved in said magazine, said separating device including a slide, a shoulder on said slide engageable with said one edge, means engageable with said end sheet adjacent the opposite edge thereof, said engageable means defining one side of the slot for providing passage from the magazine for said end sheet, said engageable means having an opening through which a suction is applied to the sheet to align said opposite edge with said slot, and means for reciprocating said slide for moving the end sheet from the magazine through said slot.

11. In a device for separating sheets from a stack, a separating device, a magazine for supporting a stack of sheets by their edges for movement toward said device, said magazine including a plurality of rods supporting said sheets by one edge, said rods being disposed in a plane declining in one direction toward said device to cause the force of gravity acting to move said stack downwardly along the rods to equal substantially the force of friction acting to prevent such movement, a guide rod engageable with another edge of said sheets, said plane also declining in another direction toward said guide rod for causing the force of gravity to move the sheets against said guide rod to align two edges of the sheets with said device as they are moved in said magazine, said separating device including a slide, a shoulder on said slide engageable with one edge of the end sheet, said slide having an opening through which a suction is applied to said sheet to align the sheet edge with said shoulder, means engageable with said sheet adjacent the opposite edge thereof, said engageable means defining one side of a slot providing passage from the magazine for said end sheet, said engageable means also having an opening through which a suction is applied to the sheet to align said opposite edge with said slot, and means for reciprocating said slide for moving said end sheet from the magazine through said slot.

12. In apparatus for separating sheets from a stack, a magazine supporting a stack of sheets for individual presentment to a separating device, said magazine declining toward said device sufficiently to cause the force of gravity tending to move the stack downwardly to equal substantially the force of friction tending to prevent such movement, means applying a predetermined force to the upper end of said stack whereby the sheet at the lower end is forced toward the separating device at said predetermined force regardless of the movement of sheets in said stack, said separating device including a slide, a shoulder on said slide engageable with one edge of the end sheet, said slide having an opening through which a suction is applied to said sheet for aligning the sheet edge with said shoulder, and means for reciprocating said slide to move said sheet edgewise from the magazine.

13. In apparatus for separating sheets from a stack, a magazine supporting a stack of sheets for individual presentment to a separating device, said magazine declining toward said device sufficiently to cause the force of gravity tending to move the stack downwardly to equal substantially the force of friction tending to prevent such movement, means applying a predetermined force to the upper end of said stack whereby the sheet at the lower end is forced against the separating device at said predetermined force regardless of the movement of sheets in said stack, said separating device including a slide, a shoulder on said slide engageable with said one edge, means engageable with said end sheet adjacent the opposite edge thereof, said engageable means defining one side of the slot for providing passage from the magazine for said end sheet, said engageable means having an opening through which a suction is applied to the sheet to align said opposite edge with said slot, and means for reciprocating the slide for moving the end sheet from the magazine through said slot.

14. In apparatus for separating sheets from a stack, a magazine supporting a stack of sheets for individual presentment to a separating device, said magazine declining toward said device sufficiently to cause the force of gravity tending to move the stack downwardly to equal substantially the force of friction tending to prevent such movement, means applying a predetermined force to the upper end of said stack whereby the sheet at the lower end is forced toward the separating device at said predetermined force regardless of the movement of sheets in said stack, said separating device including a slide, a shoulder on said slide engageable with one edge of the end sheet, said slide having an opening through which a suction is applied to said sheet to align the sheet edge with said shoulder, means engageable with said sheet adjacent the opposite edge thereof, said engageable means defining one side of a slot providing passage from the magazine for said end sheet, said engageable means also having an opening through which a suction is applied to the sheet to align said opposite edge with said slot, and means for reciprocating said slide for moving said end sheet from the magazine through said slot.

15. In a device for separating sheets from a stack, a magazine for supporting a stack of sheets for bodily movement toward one end of the magazine, a slide at said end, a shoulder on said slide engageable with one edge of the end sheet, said slide having an opening through which a suction is applied to said sheet for aligning the sheet edge with said shoulder, a member engageable with another edge of said sheet, and means for moving said slide edgewise of said sheet and at an angle toward said member whereby one edge of the sheet is moved against said member as it is fed edgewise from the magazine.

16. In apparatus for separating sheets from a stack, a separating device, a magazine for supporting a stack of sheets by their edges for movement toward said device and including surface means supporting one edge of said sheets, said surface means being disposed in a plane declining in one direction toward said device to cause the force of gravity acting to move said stack downwardly along the surface means to equal substantially the force of friction acting to prevent such movement, a guide surface engageable with another edge of said sheets, said plane also declining in another direction toward said guide surface for causing the sheets to rest against said guide surface whereby said sheets are aligned with said device by two edges as they are moved in said magazine, said separating device including a slide, a shoulder on said slide engageable with one edge of the end sheet in the stack, said slide having an opening through which a suction is applied to said sheet for aligning the sheet edge with said shoulder, and means for moving said slide edgewise of said sheet and at an angle toward said guiding surface whereby the sheet is moved against said guiding surface as it is fed edgewise from the magazine to insure guiding engagement between the sheet and the guiding surface.

17. In apparatus for separating sheets from a stack, a separating device, a magazine for supporting a stack of sheets by their edges for movement toward said device and including surface means supporting one edge of said sheets, said surface means being disposed in a plane declining in one direction toward said device to cause the force of gravity acting to move said stack downwardly along the surface means to equal substantially the force of friction acting to prevent such movement, a guide surface engageable with another edge of said sheets, said plane also declining in another direction toward said guide surface for causing the sheets to rest against said guide surface whereby said sheets are aligned with said device by two edges as they are moved in said magazine, said separating device including a slide, a shoulder on said slide engageable with said one edge, means engageable with said end sheet adjacent the opposite edge thereof, said engageable means defining one side of a slot providing passage from the magazine for said end sheet, said engageable means having an opening through which a suction is applied to the sheet to align said opposite edge with said slot, and means for moving said slide edgewise of said sheet and at an angle toward said guide surface whereby the sheet is moved against said guide surface as it is fed edgewise from the magazine to align the edge of the sheet with said slot.

18. In apparatus for feeding sheets having two locating holes in a predetermined relation to one edge thereof, an arcuate feed path for edgewise passage of individual sheets, spaced parallel disks the peripheries of which define the inner side of said path, feed pins projecting substantially radially from the peripheries of said disks and extending through said paths, arcuate cover means concentric with said disks and defining the outer side of said path, said cover means being provided with annular grooves into which extend the outer ends of the feed pins, means presenting successive individual sheets at the entrance of said path with the locating holes oriented in the path of movement of said pins, means for rotating said disks for unitary movement about a common axis for engaging successive pins with the locating holes of successive sheets for feeding said sheets along said path, means mounting said arcuate cover means for swinging movement outwardly away from said path, in the event that two or more superposed sheets enter said path, and means detecting such outward movement for controlling the operation of the apparatus in accordance with such detection.

19. In apparatus for separating and feeding sheets each having a pair of locating holes therein, a pair of parallel disks spaced to correspond to the spacing of the locating holes and mounted for unitary rotation about a common axis, feed pins projecting substantially radially from the periphery of each disk, the pins of one disk being aligned with the pins of the other disk to form pairs each adapted to engage the locating holes in an individual sheet, means for presenting individual sheets to the peripheries of said disks with the locating holes oriented in the path of movement of said feed pins, said presenting means comprising a magazine for supporting a stack of sheets, a slide at one end of said magazine, a shoulder on said slide engageable with one edge of the end sheet in the stack, a member engageable with another edge of said sheet for guiding the sheet as it is fed edgewise from the magazine for orienting the locating holes in the path of movement of said feed pins, means for moving said slide edgewise of said sheet and at an angle toward said member whereby the sheet is moved against said member as it is fed edgewise by the slide, and means rotating said disks and moving said slide in synchronized relation for moving the sheet at substantially the same velocity as the movement of the feed pins for causing the pins to enter the holes and feed the sheet continuously without interrupting its movement.

20. In apparatus for feeding sheets each having a pair of locating holes therein, feed pins spaced to correspond to the spacing of the locating holes in a single sheet, means mounting said pins in pairs for unitary movement in a circular path normal to the alignment of the pins of each pair, each feed pin having a cylindrical base portion of a size corresponding to a locating hole, the upper portion of each pin above the base portion at opposite sides being tapered and of a contour adapted to engage a substantial portion of a locating hole for guiding the hole into register with said base portion under conditions of misalignment, and means for feeding individual sheets along a second path converging with said circular path at substantially the same speed and in synchronized relation to the feed pins whereby the pins enter said holes without imparting a feeding force thereto until the base portion of the pins engage said holes.

21. In apparatus for feeding sheets each having a pair of locating holes therein, feed pins spaced to correspond to the spacing of the locating holes in a single sheet, means mounting said pins in pairs for unitary movement in a defined path normal to the alignment of the pins of each pair, each feed pin having a cylindrical base portion of a size corresponding to a locating hole, the upper portion of each pin above the base portion at opposite sides being tapered and of a contour adapted to engage a substantial portion of a locating hole for guiding the hole into register with said base portion under conditions of misalignment, and means for feeding individual sheets along a second path converging with said defined path at substantially the same speed and in synchronized relation to the feed pins whereby the pins enter said holes without imparting a feeding force thereto until the base portion of the pins engage said holes.

22. In apparatus for sensing data indications on statistical records having locating holes accurately related to said indications, feed pins spaced to correspond to the spacing of the locating holes in a single record, means mounting said pins in pairs for unitary movement in a defined path normal to the alignment of the pins of each pair, each feed pin having a cylindrical base portion of a size corresponding to a locating hole, the upper portion of each pin above the base portion at opposite sides being tapered and of a contour adapted to engage a substantial portion of a locating hole for guiding the hole into register with said base portion under conditions of misalignment, means for feeding individual sheets along a second path converging with said defined path at substantially the same speed and in synchronized relation to the feed pins whereby the pins enter said holes without imparting a feeding force thereto until the base portion of the pins engage said holes, and means adjacent said defined path and accurately located with respect to the path of movement of said pins for sensing the data indications on each record fed along said defined path.

23. In apparatus for feeding sheets each having a pair of locating holes therein, feed pins spaced to correspond to the spacing of the locating holes in a single sheet, means mounting said pins in pairs for unitary movement in a circular path normal to the alignment of the pins of each pair, each feed pin having a cylindrical base portion of a size corresponding to a locating hole, the rear side of the pin being inclined in the direction of feed, the upper portion of each pin at opposite sides above the base portion being tapered and of a contour adapted to engage a substantial portion of a locating hole for registering the hole with said base portion under conditions of misalignment, means for feeding individual sheets along a second path converging with said circular path at substantially the same speed and in synchronized relation to the feed pins whereby the pins enter said holes without imparting a feeding force thereto until the base portion of the pins engage said holes, and means for stripping each sheet from the feed pins including a stripper plate in the path of movement of and engaging one face of a sheet being fed by said pins and a feed roll having a surface speed greater than the speed of the feed pins and engaging the face of the sheet opposite said plate for moving the sheet forwardly along the inclined portions of said pins as it is stripped therefrom.

24. In apparatus for feeding sheets each having a pair of locating holes therein, feed pins spaced to correspond to the spacing of the locating holes in a single sheet, means mounting said pins in pairs for unitary movement in a circular path normal to the alignment of the pins of each pair, each feed pin having a cylindrical base portion of a size corresponding to a locating hole, the rear side of the pin above the base portion being inclined in the direction of feed, means for feeding individual sheets along a second path converging with said circular path at substantially the same speed and in synchronized relation to the feed pins whereby the pins enter said holes without imparting a feeding force thereto until the base portions of the pins engage said holes, and means for stripping each sheet from the feed pins including a stripper plate in the path of movement and engaging one face of a sheet being fed by the pins and a feed roll having a surface speed greater than the speed of the feed pins and engaging the face of the sheet opposite said plate for moving the sheet forwardly along the inclined portion of said pins as it is stripped therefrom.

25. In apparatus for sensing data indications on statistical records having locating holes accurately related to said indications, feed pins spaced to correspond to the spacing of the locating holes in a single record, means mounting said pins in pairs for unitary movement in a circular path normal to the alignment of the pins of each pairs, each feed pin having a cylindrical base portion of a size corresponding to a locating hole, the rear side of the pin above the base portion being inclined in the direction of feed, means for feeding individual records along a second path converging with said circular path at substantially the same speed and in synchronized relation to the feed pins whereby the pins enter said holes without imparting a feeding force thereto until the base portions of the pins engage said holes, means adjacent the circular path and accurately oriented with respect to the path of movement of the feed pins for sensing the data indications on each record after the locating holes are engaged with the base portions of the pins, and means for stripping each record from the feed pins after the data indications of said record have passed the sensing means including a stripper plate in the path of movement and engaging one face of the record being fed by the pins and a feed roll having a surface speed greater than the speed of the feed pins and engaging the face of the record opposite said plate for moving the record forwardly along the inclined portion of said pins as it is stripped therefrom.

26. In apparatus for feeding sheets each having a pair of locating holes therein, feed pins spaced to correspond to the spacing of the locating holes in a single sheet, means mounting said pins in pairs for unitary movement in a circular path normal to the alignment of the pins of each pair, each feed pin having a cylindrical base portion of a size corresponding to a locating hole, the rear side of the pin above the base portion being inclined in the direction of feed, means for feeding individual sheets along a second path converging with said circular path at substantially the same speed and in synchronized relation to the feed pins whereby the pins enter said holes without imparting a feeding force thereto until the base portion of the pins engage said holes, means for stripping each sheet from the feed pins including a stripper plate in the path of movement and engaging one face of a sheet being fed by the pins and a feed roll having a surface speed greater than the speed of the feed pins and engaging the face of the sheet opposite said plate for moving the sheet forwardly along the inclined portion of said pins as it is stripped therefrom, means for directing the stripped sheet into one of two paths including an oscillatable member having its axis of oscillation in the path of movement of the stripped sheet, said member having two opposed substantially flat surfaces each forming an acute angle with and passing through the axis of oscillation of the member, and means for oscillating said member between two positions for presenting one or the other of said surfaces in the path of movement of the sheet for directing the sheet into one or the other of said two paths.

27. In apparatus for sensing data indications on statistical records having locating holes accurately related to said indications, feed pins spaced to correspond to the spacing of the locating holes in a single record, means mounting said pins in pairs for unitary movement in a circular path, each feed pin having a cylindrical base portion of a size corresponding to a locating hole, the rear side of the pin above the base portion being inclined in the direction of feed, means for feeding individual records along a second path converging with said circular path at substantially the same speed and in synchronized relation to the feed pins whereby the pins enter said holes without imparting a feeding force thereto until the base portion of the pins engage said holes, means adjacent the circular path and accurately oriented with respect to the path of movement of said feed pins for sensing the data indications on each record after the locating holes are engaged with said base portions of the pins, means for stripping each record from the feed pins after the data indications of said record have passed the sensing means including a stripper plate in the path of movement and engaging one face of a record and a feed roll having a surface speed greater than the speed of the feed pins and engaging the face of the record opposite said plate for moving the record forwardly along the inclined portion of said pins as it is stripped therefrom, means for directing the stripped record into one of two paths, said directing means including an oscillatable member having its axis of oscillation in the path of movement of the stripped record, said member having two opposed substantially flat surfaces each forming an acute angle with and passing through the axis of oscillation of the member, and means for oscillating said member between two positions for presenting one or the other of said surfaces in the path of movement of the record for directing the record into one or the other of said two paths.

28. In apparatus for selecting one of two paths along which sheets may be fed edgewise, means for feeding individual sheets along a defined path, path selecting means at the end of the defined path including an oscillatable member having its axis of oscillation in said path, said member having two opposed substantially flat surfaces each forming an acute angle with and passing through the axis of oscillation of the member, and means for oscillating said member between two positions for presenting one or the other of said surfaces in the path of movement of the sheet.

29. In apparatus for selecting one of two paths along which sheets may be fed edgewise, means for feeding each sheet individually along a defined path, one or more sleeves at the end of said defined path, rolls at opposite sides of said sleeves, said sleeves and said rolls defining two paths along which each sheet may be fed from said defined path, and oscillatable member at the leading end of each sleeve and co-axial therewith, said member having two opposed substantially flat surfaces each forming an acute angle with and passing through the axis of oscillation of the member, and means for oscillating said member between two positions for presenting one or the other of said surfaces in the path of movement of the sheet for directing said sheet into engagement with the feed rolls defining one or the other paths.

30. In apparatus for feeding statistical records having data coded thereon, means for feeding individual records along a defined path, means adjacent said path for sensing the data coded on each record as it is fed along said path, path selecting means at the end of the defined path including an oscillatable member having its axis of oscillation in said path, said member having two opposed substantially flat surfaces each forming an acute angle with and passing through the axis of oscillation of the member, and means for oscillating said member between two positions for presenting one or the other of said surfaces in the path of movement of the record, said oscillating means being adapted to be controlled in accordance with the significance of the data sensed by said sensing means.

31. In apparatus for feeding statistical records having data coded thereon, means for feeding individual records along a defined path, means adjacent said path for sensing the data coded on each record as it is fed along said path, one or more sleeves at the end of the defined path, rolls at opposite sides of said sleeves, said sleeves and said rolls defining two paths along which each record may be fed from said defined path, an oscillatable member at the leading end of each sleeve and co-axial therewith, said member having two opposed substantially flat surfaces each forming an acute angle with and passing through the axis of oscillation of the member, and means for oscillating said member for presenting one or the other of said surfaces in the path of movement of the record for directing the record into engagement with the feed rolls defining one or the other of said two paths, said oscillating means being adapted to be controlled in accordance with the significance of the data sensed by said sensing means.

32. Apparatus for automatically handling individual sheets each of which has locating holes therein and carries data indications, comprising: feeding means having feed pins mounted for movement in a circular path and spaced to correspond to the spacing of the locating holes in each sheet for engagement with said holes to move the sheet along said path; other means for first feeding each sheet along another path converging with said circular path at substantially the same speed and in synchronized relation to the feed pins to facilitate entry of the pins into said holes while moving at substantially the same speed as said sheet; and data sensing means for sensing the data indicaitons of a sheet as said sheet is carried along said circular path by said feed pins.

33. The combination according to claim 32, wherein said other means comprises a reciprocating slide member.

34. The combination according to claim 33, wherein said conveyor means comprises a rotary feed wheel having said feed pins projecting substantially radially from the periphery thereof.

35. The combination according to claim 32, wherein each feed pin includes a cylindrical base portion of a size corresponding to a locating hole, the upper portion of each pin being tapered.

36. Apparatus for feeding individual sheets each having locating holes therein comprising: an arcuate feed path for edgewise passage of individual sheets; a feed wheel the periphery of which defines the inner side of said path; feed pins projecting from the periphery of said wheel and extending through said path; arcuate cover means concentric with said wheel and defining the outer side of said path; means presenting successive individual sheets at the entrance of said path with the locating holes oriented in the path of movement of said pins; means for rotating said wheel for engaging said pins with the locating holes of successive sheets for feeding said sheets along said path; means mounting said arcuate cover means for swinging movement outwardly away from said path in the event that two or more superposed sheets enter said path; and means detecting such outward movement for controlling the operation of the apparatus in accordance with such detection.

37. In apparatus for presenting sheets to a separating device, a magazine for supporting a stack of sheets for movement toward said device, a plate engaging the outer end of said stack, a carriage on which the plate is mounted, means for guiding the carriage in a direction substantially parallel to the direction in which said magazine extends, an endless belt having one run connected to said carriage, pulleys mounting said belt, and motor means supplying a predetermined constant torque to one of said pulleys for causing the plate to be pressed against said stack.

38. In apparatus for presenting sheets to a separating device, a magazine for supporting a stack of sheets for movement toward said device, a plate engaging the outer end of said stack, a carriage on which the plate is mounted, means for guiding the carriage in a direction substantially parallel to the direction in which said magazine extends, means for operating said carriage, said operating means including: an electric motor and a drive train between said motor and said carriage, said drive train including at least one rotary member and means for maintaining the torque applied to said rotary member from said motor substantially constant.

39. The combination according to claim 38, wherein said maintaining means comprises a slip coupling means driven by said electric motor and which will slip when the torque transmitted therethrough exceeds a given magnitude.

40. The combination according to claim 39 further comprising adjusting means for said slip coupling means for controlling the torque magnitude which will cause said slip coupling means to commence slipping.

References Cited by the Examiner
UNITED STATES PATENTS

| | | | |
|---|---|---|---|
| 685,608 | 10/1901 | Hollerith | 209—110 X |
| 2,618,386 | 11/1952 | Samain | 209—111.5 |
| 2,648,181 | 8/1953 | Dalton. | |
| 2,749,118 | 6/1956 | Kerr et al. | |
| 2,805,825 | 9/1957 | Jorgensen et al. | 235—92 |
| 2,827,120 | 3/1958 | Davidson | 226—76 X |
| 2,827,290 | 3/1958 | Dixon et al. | 271—44 X |
| 2,864,481 | 12/1958 | Strecker | 192—111 |
| 2,908,496 | 10/1959 | Long | 271—32 |
| 2,936,169 | 5/1960 | Nelson | 271—5 |
| 2,944,812 | 7/1960 | Winkler et al. | 271—1 |
| 2,956,801 | 10/1960 | Coakley | 271—5 |
| 2,989,181 | 6/1961 | Dickinson | 209—111.5 |
| 2,994,429 | 8/1961 | Luhn et al. | 209—111.5 |
| 3,033,445 | 5/1962 | Dreyer | 226—76 X |

ROBERT B. REEVES, *Primary Examiner.*

CLAUDE A. LEROY, FRANK L. ABBOTT, WILLIAM B. LABORDE, M. HENSON WOOD, JR., *Examiners.*

A. D. BRUFSKY, E. D. DREYFUS, R. A. SCHRACHER,
*Assistant Examiners.*

UNITED STATES PATENT OFFICE
CERTIFICATE OF CORRECTION

Patent No. 3,259,239            July 5, 1966

Richard M. Elliott et al.

It is certified that error appears in the above identified patent and that said Letters Patent are hereby corrected as shown below:

In the grant, line 4 and in the heading to the printed specification. line 6, "a corporation of New York", each occurrence, should read -- a corporation of Delaware --. Column 1, line 41, "the", first occurrence, should read -- and --. Column 15, line 11, "pairs" should read -- pair --. Column 16, line 41, "and" should read -- an --.

Signed and sealed this 19th day of August 1969.

(SEAL)
Attest:

Edward M. Fletcher, Jr.        WILLIAM E. SCHUYLER, JR.

Attesting Officer              Commissioner of Patents